Feb. 12, 1935.    R. E. WILEY    1,990,509
MACHINE TOOL
Original Filed March 19, 1931    4 Sheets-Sheet 1

INVENTOR.
Robert E. Wiley
BY
ATTORNEY.

Feb. 12, 1935.     R. E. WILEY     1,990,509
MACHINE TOOL
Original Filed March 19, 1931     4 Sheets-Sheet 2
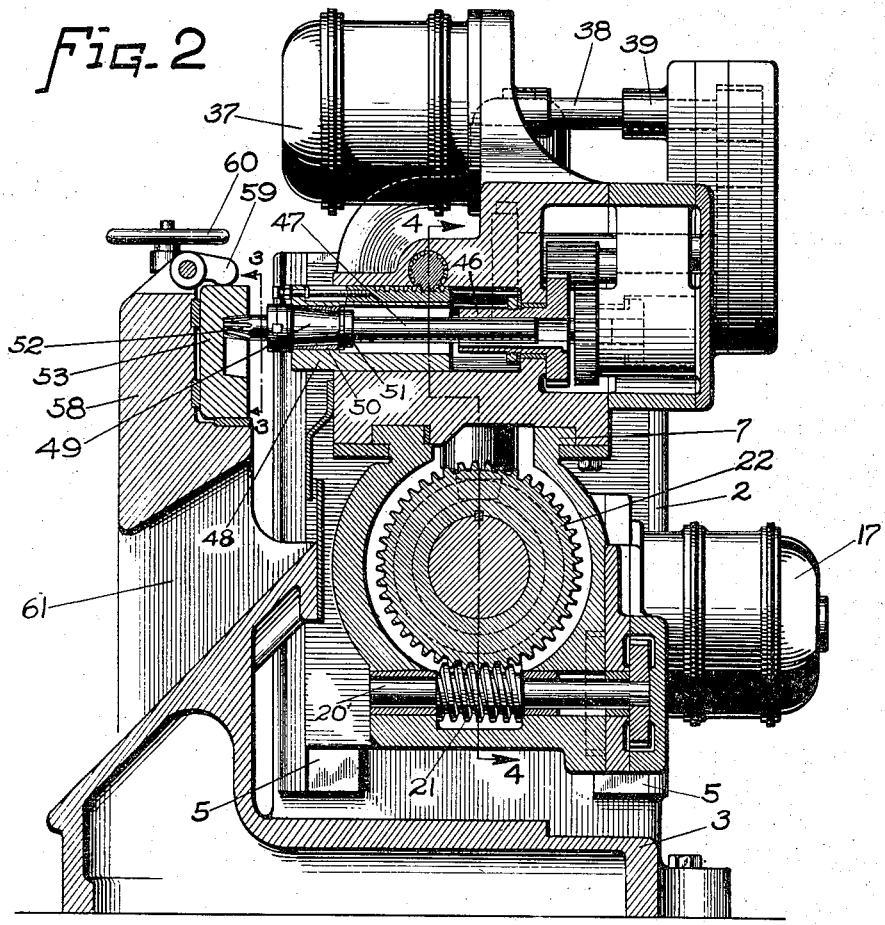
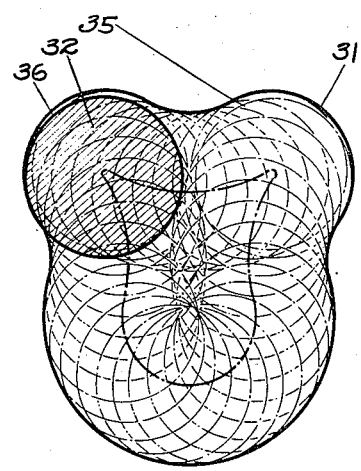
INVENTOR.
Robert E. Wiley
BY
ATTORNEY.

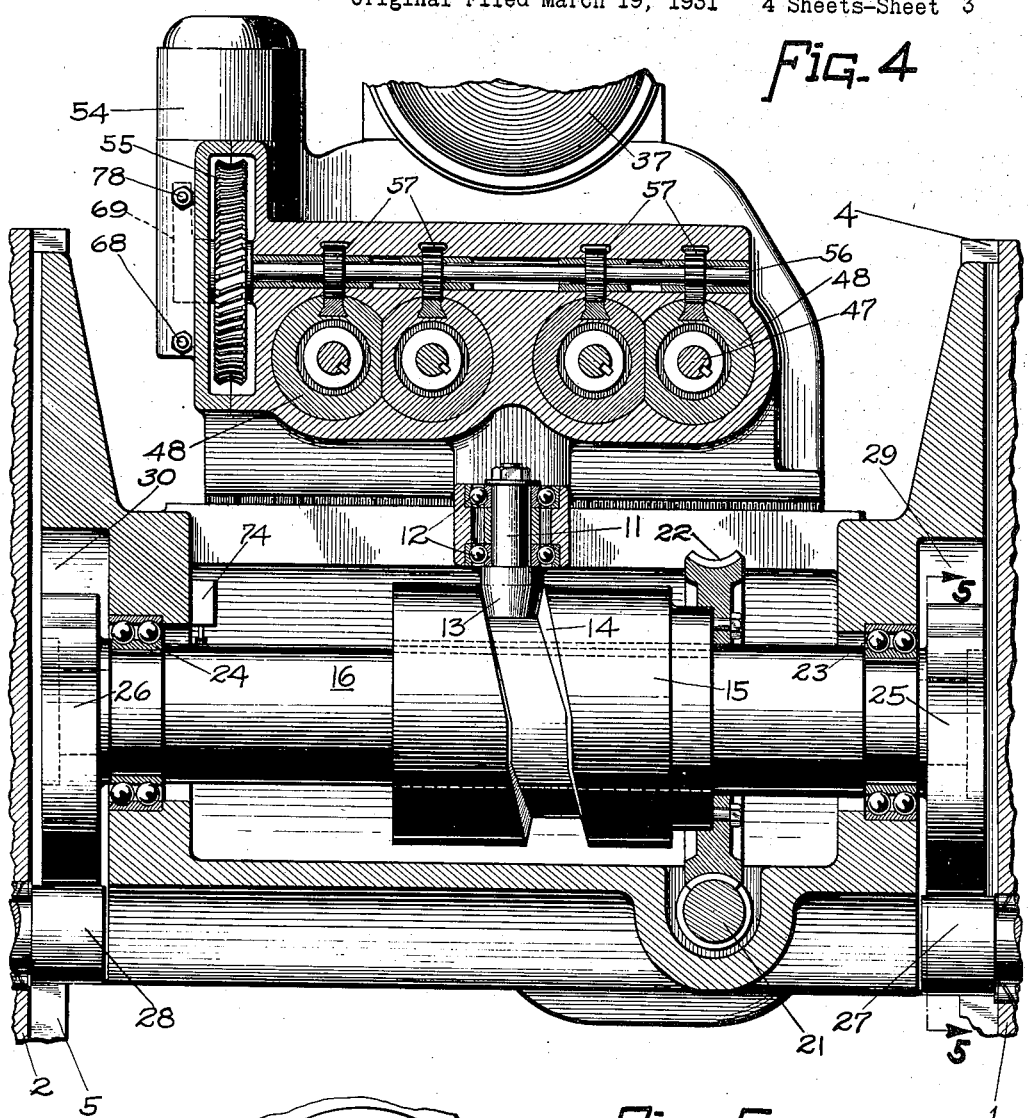
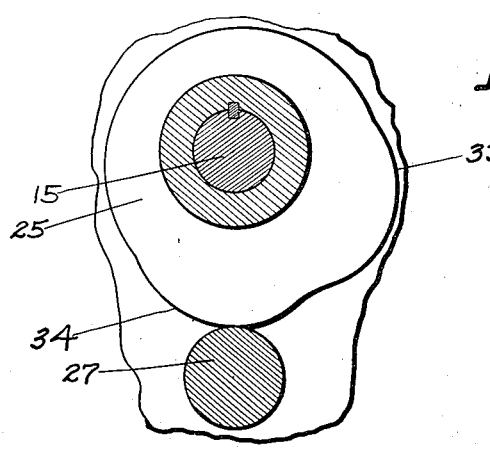

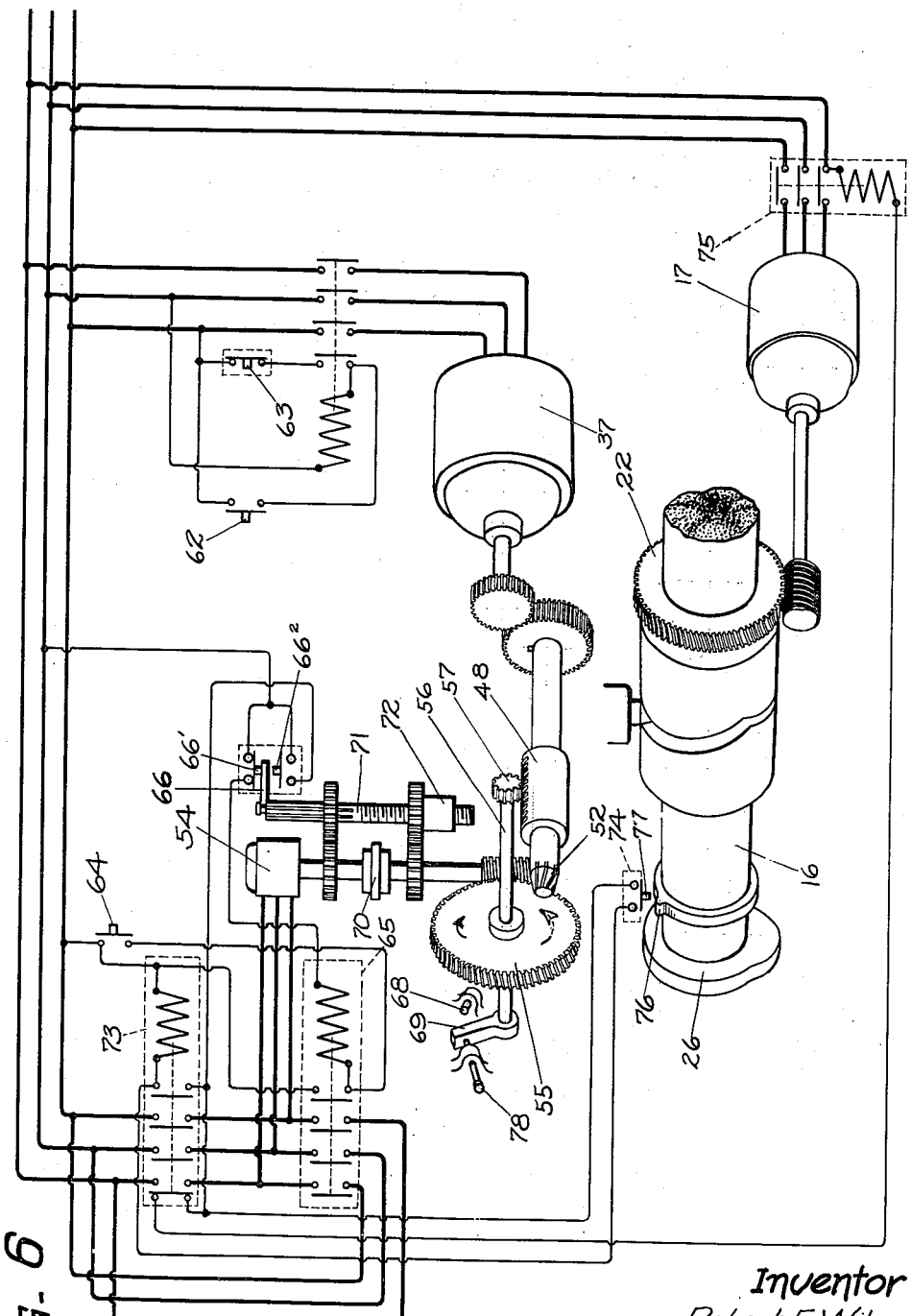

Patented Feb. 12, 1935

1,990,509

UNITED STATES PATENT OFFICE 1,990,509

MACHINE TOOL

Robert E. Wiley, Rockford, Ill., assignor to The Ingersoll Milling Machine Company, Rockford, Ill., a corporation of Illinois Application March 19, 1931, Serial No. 523,685
Renewed May 2, 1934

21 Claims. (Cl. 90—15)

The present invention relates in general to machine tools and more particularly has to do with the milling of surfaces at predetermined depths in work pieces.

One object of the invention is to provide means for imparting a compound motion to a rotating cutter in directions transversely to its axis of rotation when the same is operating upon the work in conformity with certain operating conditions such, for instance, as those required for machining surfaces bounded by irregular contours.

Another object is to provide a machine tool having a novel motor driven mechanism by which a cutting tool and work piece are moved relative to each other in an automatic cycle involving entry of the tool in the work piece to a depth predetermined by the position of a positive stop.

The invention also resides in the novel character of the means by which the driving mechanism is controlled to define the cycle.

In the accompanying drawings forming a part of the present specification:

Fig. 2 is a vertical section on the line 2—2, Fig. 1;

Fig. 3 is a schematic view showing the outline of a compression recess and the path of movement of a tool when machining the same;

Fig. 4 is a detail view in vertical section on the line 4—4, Fig. 2;

Fig. 5 is a detail view in elevation on the line 5—5, Fig. 4; and

Fig. 6 is a diagram of the electric control.

Figure 1:
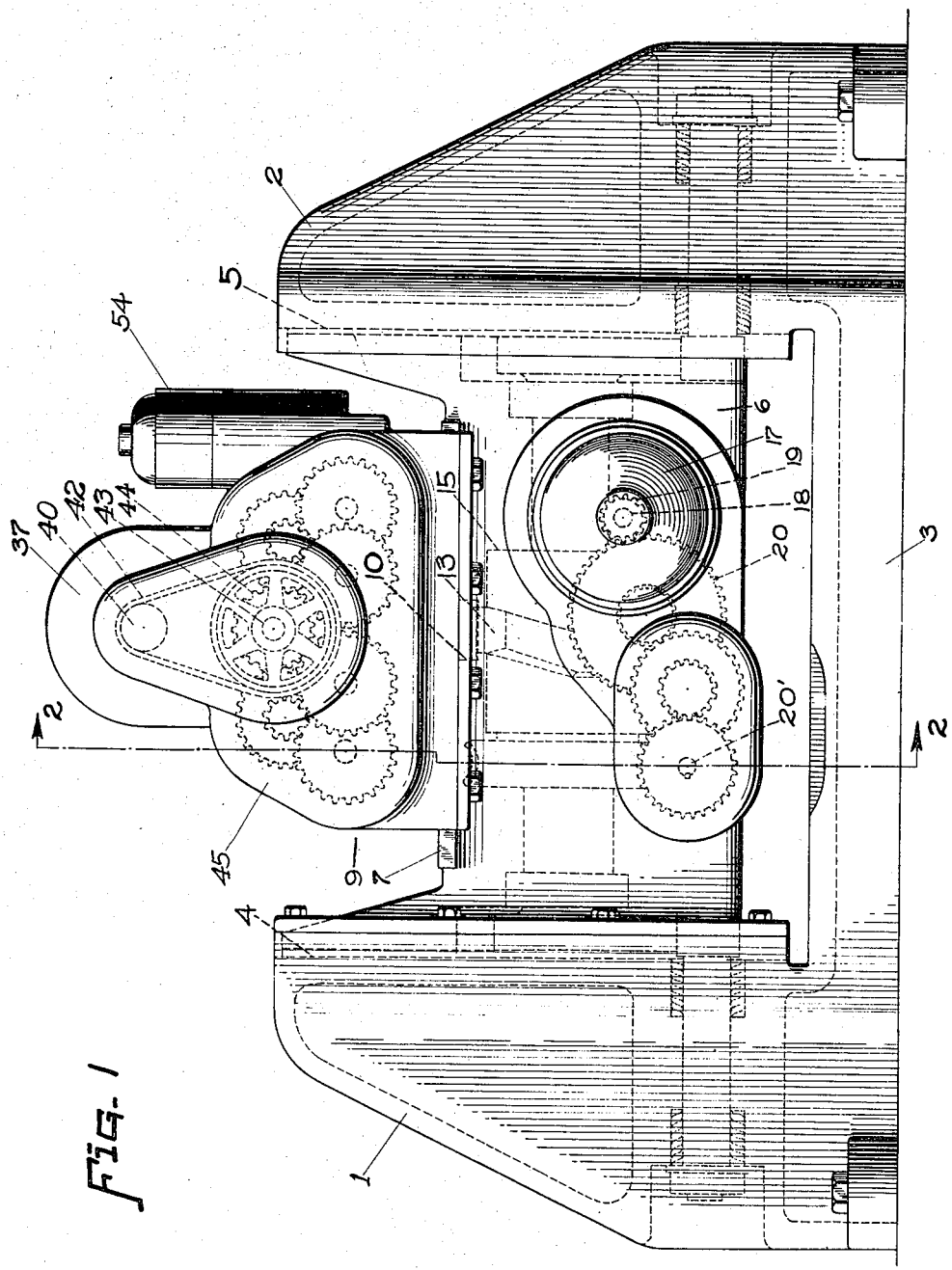
Fig. 1 is a view in end elevation of a machine embracing the present invention.

Referring now to the drawings in detail, the machine shown by way of illustration comprises a pair of spaced side columns 1 and 2 joined at their lower ends preferably by an integral base portion 3. Arranged on the inside face of each of the columns 1 and 2 are a pair of ways or slides 4 and 5 made to accommodate a tool supporting carriage 6. This carriage 6 is mounted for translation on the vertical ways 4 and 5 and the top portion thereof is equipped with transverse horizontal ways or slides 7 and 8 on which the tool saddle 9 is mounted for horizontal translation.

This tool saddle 9 has a depending post 10 formed as a part of the casing thereof, approximately in the center of its underside. Mounted in this post is a follower pin 11. The pin is set in a ball bearing assembly 12 with freedom of rotation and the headed end 13 thereof fitting in the camming groove 14 of the cylinder 15. The cylinder 15 is mounted on the horizontal shaft 16 intermediate its ends, and is made to turn therewith. The cam shaft 16 is driven by a motor 17. Fixed on the shaft 18 of the motor 17 is a driving pinion 19 which is in mesh with the gear 20 of a reduction unit, thus connecting the motor in driving relation with the countershaft 20'. Mounted on the shaft 20 is a worm 21 which meshes with the worm gear 22 on the cam shaft 16.

The cam shaft 16 is mounted in anti-friction bearings 23 and 24 on the carriage 6, and the ends of the shaft are each equipped with rise and fall cams 25 and 26 which wipe over the follower rollers 27 and 28. These rollers are mounted on the ends of stud shafts which are journaled with freedom of rotation in the side columns. The carriage 6 is relieved as at 29 and 30 to accommodate the rise and fall followers 25 and 26.

It will thus be seen that when the motor 17 is running, rotation of the shaft 16 will cause the cams 25 and 26 to wipe over the followers 27 and 28 and collectively reciprocate the carriage in a vertical plane. As a result of the cylinder cam arrangement referred to, rotation of the shaft 16 will cause the saddle 9 to be reciprocated in a horizontal plane while the saddle and carriage are collectively reciprocating in a vertical plane. This provision accounts for the compound motion for the tools; in other words, the two parts of the tool support are collectively reciprocated or moved in one plane while one of the parts thereof is reciprocating in another plane.

By reference to the diagrammatic view in Figure 3, the reason for this compound motion will be apparent. In this connection the outline 31 represents the contour of a compression recess, and the outline 32 represents the outline of the tool. Considering that the tool is started in the position indicated in this figure, it must follow the contour of the recess to machine the margin, and at the same time, it must machine the surface bounded by the margin. Since the contour of the recess is irregular both in width and height, the cams on the end of the shaft 16, and the camming groove in the cylinder 15 must be made to correspond to these irregularities. Therefore, the cams 25 and 26 are made with compound elevations or protuberances 33 and 34 to get the necessary height to the reciprocation so that the tool will be caused to traverse the bulging areas 35 and 36 of the recess. In order to bring the tool around the constricted width of the recess, the groove 14 in the cylinder 15 is so formed as to limit the reciprocation of the saddle on the rail at this time in the operating cycle.

The illustrative example of the invention selected for the present purpose includes only four tools. Such an embodiment would be designed for a four cylinder head. Of course, it is understood that any number of tools required can be substituted for the showing made.

Mounted on the saddle 9 is a motor 37 for driving the tools. The shaft 38 of the motor extends through a suitable bearing 39, and carries on its end a sprocket wheel 40 which is connected in driving relation with the driven sprocket wheel 41 by the sprocket chain 42. Mounted on the sprocket shaft 43 is a driving gear 44 off which the drive is taken for each of the tools through means of the reduction gear units housed in the gear box 45.

The spindle gear for each tool is made with an internally splined sleeve 46 for the reception of the splined spindle shafts 47. The spindles 49 extend through the sleeves 48 and are connected in driving relation with the tools 52. The bearings in the sleeves 48 for the spindles are bushed as at 50 and suitable clamping means indicated as at 51 securely holds the spindles in the sleeves.

In order to cut into depth, the tools 52 are fed to and from the stationary work 53 by means of a feed motor 54. The shaft of this motor is equipped with a worm which meshes with a worm wheel 55 on the end of a cross shaft 56. Keyed on this cross shaft are pinions 57 which mesh with the rack faces on the top of the sleeves 48. When the motor is running in one direction, the tools will be fed toward the work and reversal of the motor will retract the tools.

The work may be held in place on the fixture stand 58 by a clamping arrangement 59 operated by the hand wheel 60.

Chip clearance is accounted for through the chute 61 in which the chips will fall as the metal is removed.

A diagram of the control circuits for the machine is shown in Fig. 6. Here 62 is the starting switch for the tool driving motor 37 and 63 is the stop switch therefor.

The motor 37 can run continuously so long as the machine is in production.

To initiate an operating cycle, considering the motor 37 is running, the operator will close the switch 64. This will close the circuit to the feed motor 54, through the magnetic starting switch 65. The circuit selector 66 will, at this time, close the circuit at the contact 66'; and as a result the motor 54 will rotate in a forward direction, thus rotating the worm wheel 55 in the direction of the solid line arrow. This will feed the tools into the work to a predetermined depth determined by the stop pin 68. When the arm 69 moves against the stop pin 68, the friction clutch 70 slips which interrupts the feed to the tools.

The feed motor 54 continues to run, however, rotating the splined shaft 71. Threaded on this shaft 71 is a nut 72 which at this time is held against rotation due to the arm 69 resting against the pin 68. This causes an axial movement of the shaft 71 which pulls the selector switch away from the contact 66' opening the circuit through the switch 65 and closing the circuit to the switch 73 when it contacts with the contact 66². In the meantime, the switch 74 is still open, therefore, the switch 73 will not respond and as a result the circuit is completed through the switch 75 to the cam motor 17. This starts the motor 17 and operates the cam shaft 16 to develop the compound motion for the tools. At the completion of one turn of the shaft 16, which is sufficient to develop the required profiling operations of the tools, the contact 76 will actuate the contact 77 completely closing the circuit to switch 73. As the switch 73 thus responds, it opens the circuit to the motor 17 through the switch 75. The shaft 16 now comes to rest with the tools in their starting position as shown in Fig. 3. At this time the feed motor 54 is reversed which retracts the tools. As the arm 69 comes to rest against the stop pin 78, the friction clutch 70 again comes into play with the result that the arm 66 is moved against the contact 66'. The machine is now set for another operation and this can be initiated by the operator operating the switch 64.

Having thus described and shown an embodiment of this invention, what I claim and desire to secure by Letters Patent of the United States is:

1. In a machine tool, the combination of a rotary tool, a work support for holding the work stationary when the tool is performing an operation thereon, means for feeding the tool to and from the work, stop mechanism for limiting the tool feed, and means for imparting a compound motion to the tool in directions transversely to its axis of rotation when the same is operating upon the work, comprising a tool carriage and a tool saddle on said carriage and means for moving said carriage and saddle collectively in one plane and at the same time moving the saddle in another plane.

2. In a machine tool, the combination of a rotary tool, a work support for holding the work stationary when the tool is performing an operation thereon, means for feeding the tool to and from the work, stop mechanism for limiting the tool feed, and means for imparting a compound motion to the tool in directions transversely to its axis of rotation when the same is operating upon the work, comprising a tool carriage and a tool saddle on said carriage, motor driven camming means for collectively moving the carriage and saddle in one plane and a second camming means for moving the saddle in another plane.

3. In a machine tool, the combination of a rotary tool, a work support for holding the work stationary when the tool is performing an operation thereon, means for feeding the tool to and from the work, stop mechanism for limiting the tool feed, and means for imparting a compound motion to the tool in directions transversely to its axis of rotation when the same is operating upon the work, comprising a tool carriage and a tool saddle on the carriage, motor driven camming means for collectively moving the carriage and saddle in a vertical plane and a second camming means for moving the saddle in a horizontal plane.

4. In a machine tool, the combination of a rotary tool, a work support for holding the work stationary when the tool is performing an operation thereon, means for feeding the tool to and from the work, stop mechanism for limiting the tool feed, and means for imparting a compound motion to the tool in directions transversely to its axis of rotation when the same is operating upon the work, comprising a tool carriage and a tool saddle on the carriage, camming means for collectively moving said carriage and saddle, in one plane, a second camming means for moving the saddle in another plane and a motor common to both of said camming means for actuating the same.

5. In a machine tool, the combination of a rotary tool, a work support for holding the work stationary when the tool is performing an operation thereon, means for feeding the tool to and from the work, stop mechanism for limiting the tool feed, and means for imparting a compound motion to the tool in directions transversely to its axis of rotation when the same is operating upon the work, comprising a tool supporting saddle, a rail on which said saddle is mounted for reciprocation and means for reciprocating the rail in one plane and at the same time reciprocating the saddle on the rail in another plane.

6. In a machine tool, the combination of a rotary tool, a work support for holding the work stationary when the tool is performing an operation thereon, means for feeding the tool to and from the work, stop mechanism for limiting the tool feed, and means for imparting a compound motion to the tool in directions transversely to its axis of rotation when the same is operating upon the work, comprising a tool supporting saddle, a rail on which said saddle is mounted for reciprocation and means for reciprocating the rail in one plane and at the same time reciprocating the saddle on the rail in another plane, comprising a motor driven cam shaft, and cams on said shaft for reciprocating both the saddle and the rail.

7. In a machine tool, the combination of a plurality of tools mounted for parallel rotation in a substantially horizontal plane, a work support, means for feeding said tools to and from the work support, spaced side columns, a rail mounted for reciprocation in a vertical plane between said columns, a tool saddle mounted for reciprocation in a horizontal plane upon said rail and means for reciprocating said rail and said saddle in their respective planes when the tool is performing an operation on the work.

8. In a machine tool, the combination of a plurality of tools mounted for parallel rotation in a substantially horizontal plane, a work support, means for feeding said tools to and from the work support, spaced side columns, a tool carriage mounted for reciprocation in a vertical plane between said columns, a tool saddle mounted for reciprocation in a horizontal plane upon said carriage, a motor driven shaft, camming means on said shaft for collectively reciprocating the carriage and saddle and other camming means on the shaft for reciprocating the saddle on the carriage.

9. In a machine tool, the combination of a work support, a tool for operating upon the work held by the work support, motor driven means for effecting a relative feed between the work and the tool, for feeding the tool to depth, motor driven means for effecting relative motion between the tool and the work after the tool has been fed to depth, and a control circuit including circuit closing and interrupting means for energizing the feed motor and automatically stopping the same, and circuit closing and interrupting means for automatically energizing the second named motor approximately simultaneously with the stopping of the feed motor and for stopping the second named motor at a predetermined time.

10. The combination as set forth in claim 9 and in which the tool is motor driven with a manually operable circuit closing means for controlling the motor circuit.

11. In a machine tool, the combination of a rotary tool, a work support for holding the work to be machined, mechanism for effecting relative feeding motion between the tool and the work for feeding the tool to depth, a motor for operating said feeding mechanism, a stop device operable automatically for cutting out said motor when the tool has been fed to a predetermined depth, means for imparting relative compound motion between the tool and the work in directions transversely to the axis of rotation of the tool, comprising a tool carriage and a tool saddle on said carriage, motor driven means for moving said carriage and saddle collectively in one plane and at the same time moving the saddle in another plane and a control for said motor comprising a circuit interrupter operable to stop the motor automatically upon completion of the operating cycle of said relative compound motion.

12. In a machine tool, the combination of a rotary tool, a work support for holding the work to be machined, mechanism for effecting relative feeding motion between the tool and the work for feeding the tool to depth, a motor for operating said feeding mechanism, a stop device operable automatically for cutting out said motor when the tool has been fed to a predetermined depth, means for imparting relative compound motion between the tool and the work in directions transversely to the axis of rotation of the tool, comprising a tool carriage and a tool saddle on said carriage, motor driven means for moving said carriage and saddle collectively in one plane and at the same time moving the saddle in another plane and a circuit closure for said motor operable automatically to close the circuit when the feed motor has stopped and means operable to stop the motor automatically upon completion of the operating cycle of said relative compound motion.

13. In a machine tool, the combination of a work support, a tool for operating upon the work held by the work support, means for effecting a relative feed between the work and the tool axially thereof, means for effecting relative motion between the tool and work in a direction transversely to the direction of feed and means intercontrolled with the feeding means for starting the last named means automatically at a predetermined stage in the operation of the feeding means.

14. In a machine tool, the combination of a work support, a tool for operating upon the work held by the work support, means for effecting a relative feed between the work and tool axially thereof to feed the tool to a predetermined depth into the work, means for effecting relative motion between the tool and work in a direction transversely to the direction of feed and means intercontrolled with the feeding means for starting the last named means automatically when the tool is fed into the work to a predetermined depth and means for stopping the last named means before the feeding means is again operated.

15. In a machine tool, the combination of a work support, a tool for operating upon the work held by the work support, motor driven means for effecting a relative feed between the work and the tool axially thereof, independently operable motor driven means for effecting relative motion between the tool and work in a direction transversely to the direction of said feed, and means intercontrolled with the feeding means for initiating effective operation of the last named means automatically at a predetermined stage in the operation of the feeding means.

16. In a machine tool organization, the combination of work and tool supports one of which is movably mounted, electric motor driving means operatively connected to said movable support and operable selectively to move the support in different directions, the driving connection including a device normally operable to cause transmission of power to the movable support but adapted to yield and permit of independent operation of the driving means, a stop positioned to limit the movement of the movable support by said driving means in one of said directions whereby to cause yielding of said device when the tool has entered the work piece to a predetermined depth, and switch means actuated automatically during the operation of said driving means subsequent to the engagement of said stop and operable to control said driving means and initiate movement of the movable support thereby in said other direction.

17. In a machine tool organization, the combination of work and tool supports mounted for relative movement, two electric motors operatively associated with said supports and operable selectively to effect relative motions of different characters between said supports, the driving connection for one of said motors including a friction slip device normally engaged, stop means for limiting the relative movement between said supports by said last mentioned motor after the tool has entered the work to a predetermined depth, whereby to permit continued operation of the motor by causing slippage of said device, and switch means actuated during the operation of said motor subsequent to the operation of said stop means and operable to initiate operation of the other motor.

18. In a machine tool organization, the combination of a support for a work piece, a support for a tool, said supports being mounted for relative movement, an electric motor having a driving connection with one of said supports and operable to produce relative motions between said supports in a direction to cause the tool to enter the work including a device normally acting to cause transmission of the motion of the motor to one of said supports but yieldable to permit operation of the motor independently of the support, a stop for limiting the depth to which said tool may be advanced into the work piece by said motor whereby to cause yielding of said device in the continued operation of the motor, means operable to detect a predetermined amount of movement of the motor subsequent to engagement of said stop, a second motor operable to effect relative movement between said supports in a different direction, and means controlled by said last mentioned means for initiating operation of said second motor.

19. In a machine tool organization, the combination of work and tool supports mounted for relative movement, two electric motors having driving connections with said supports and operable selectively to produce relative motions between said supports in different directions, one of said connections including a device normally acting to cause transmission of the motion of one motor to one of said supports but yieldable to permit continued operation of the motor independently of the support, stop means for limiting the relative movement between said supports by said last mentioned motor whereby to cause yielding of said device when the tool has entered the work to a predetermined depth, and means responsive to the independent movement of the motor subsequent to the operation of said stop means and operable to initiate operation of the other motor and relative movement between said supports in said other direction.

20. In a machine tool organization, the combination of work and tool supports mounted for relative movement, two electric motors having driving connections with said supports and operable selectively to produce relative motions between said supports in different directions, one of said connections including a device normally acting to cause transmission of the motion of one motor to one of said supports but yieldable to permit continued operation of the motor independently of the support, stop means for limiting the relative movement between said supports by said last mentioned motor whereby to cause yielding of said device, and means responsive to the independent movement of the motor subsequent to the operation of said stop means and operable to interrupt the operation of the motor and initiate operation of the other motor to effect relative movement between said supports in said other direction.

21. In a machine tool organization, the combination of work and tool supports one of which is movably mounted, electric motor driving means operatively connected to said movable support and operable selectively to move the support in different directions, the driving connection including two parts normally held against relative movement for causing transmission of power from said driving means to said support but adapted for movement relative to each other when a predetermined torque has developed in said connection, a stop positioned to limit the movement of said movable support by said driving means in one of said directions whereby to cause relative movement of said parts when the tool has entered the work to a predetermined depth, and means operable automatically at a predetermined stage in the relative movement between said parts after engagement of said stop to control said driving means and initiate movement of the movable support in said other direction.

ROBERT E. WILEY.